United States Patent
Allgeier et al.

(10) Patent No.: US 7,454,898 B2
(45) Date of Patent: Nov. 25, 2008

(54) VEHICLE WITH A SUPPLY UNIT

(75) Inventors: Thorsten Allgeier, Untergruppenbach (DE); Ian Faye, Stuttgart (DE); Ulrich Gottwick, Stuttgart (DE); Jan-Michael Graehn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/296,767

(22) Filed: Dec. 7, 2005

(65) Prior Publication Data
US 2006/0137332 A1    Jun. 29, 2006

(30) Foreign Application Priority Data
Dec. 28, 2004   (DE) ........................ 10 2004 063 071

(51) Int. Cl.
*F01N 3/00* (2006.01)
(52) U.S. Cl. ............................. 60/286; 60/298; 60/303
(58) Field of Classification Search .................. 60/286, 60/298, 303, 685, 295
See application file for complete search history.

(56) References Cited

U.S. PATENT DOCUMENTS

| | | | | |
|---|---|---|---|---|
| 5,447,142 A * | 9/1995 | Bailey | ....................... | 123/527 |
| 5,709,080 A * | 1/1998 | Arora et al. | ................... | 60/274 |
| 6,063,350 A * | 5/2000 | Tarabulski et al. | ....... | 423/239.1 |
| 6,209,315 B1 * | 4/2001 | Weigl | ........................... | 60/274 |
| 6,273,120 B1 * | 8/2001 | Hofmann et al. | .............. | 137/98 |
| 6,550,250 B2 * | 4/2003 | Mikkelsen et al. | ............ | 60/685 |
| 6,655,130 B1 * | 12/2003 | Kirwan et al. | .................. | 60/284 |
| 6,739,125 B1 * | 5/2004 | Mulligan | ...................... | 60/286 |
| 6,823,662 B1 * | 11/2004 | Yamamoto et al. | ............ | 60/286 |
| 6,976,353 B2 * | 12/2005 | Daniel et al. | ................... | 60/275 |
| 2004/0020188 A1 * | 2/2004 | Kramer et al. | ................ | 60/275 |

* cited by examiner

*Primary Examiner*—Thomas E Denion
*Assistant Examiner*—Diem Tran
(74) *Attorney, Agent, or Firm*—Michael J. Striker

(57) ABSTRACT

A vehicle has a fuel system operative to chemically reform a fuel gas, a supply unit for supplying the fuel system with the fuel gas, and a gas reservoir provided with a storage volume for an intermediate storage of the fuel gas, the storage volume having a size that is changeable.

12 Claims, 4 Drawing Sheets

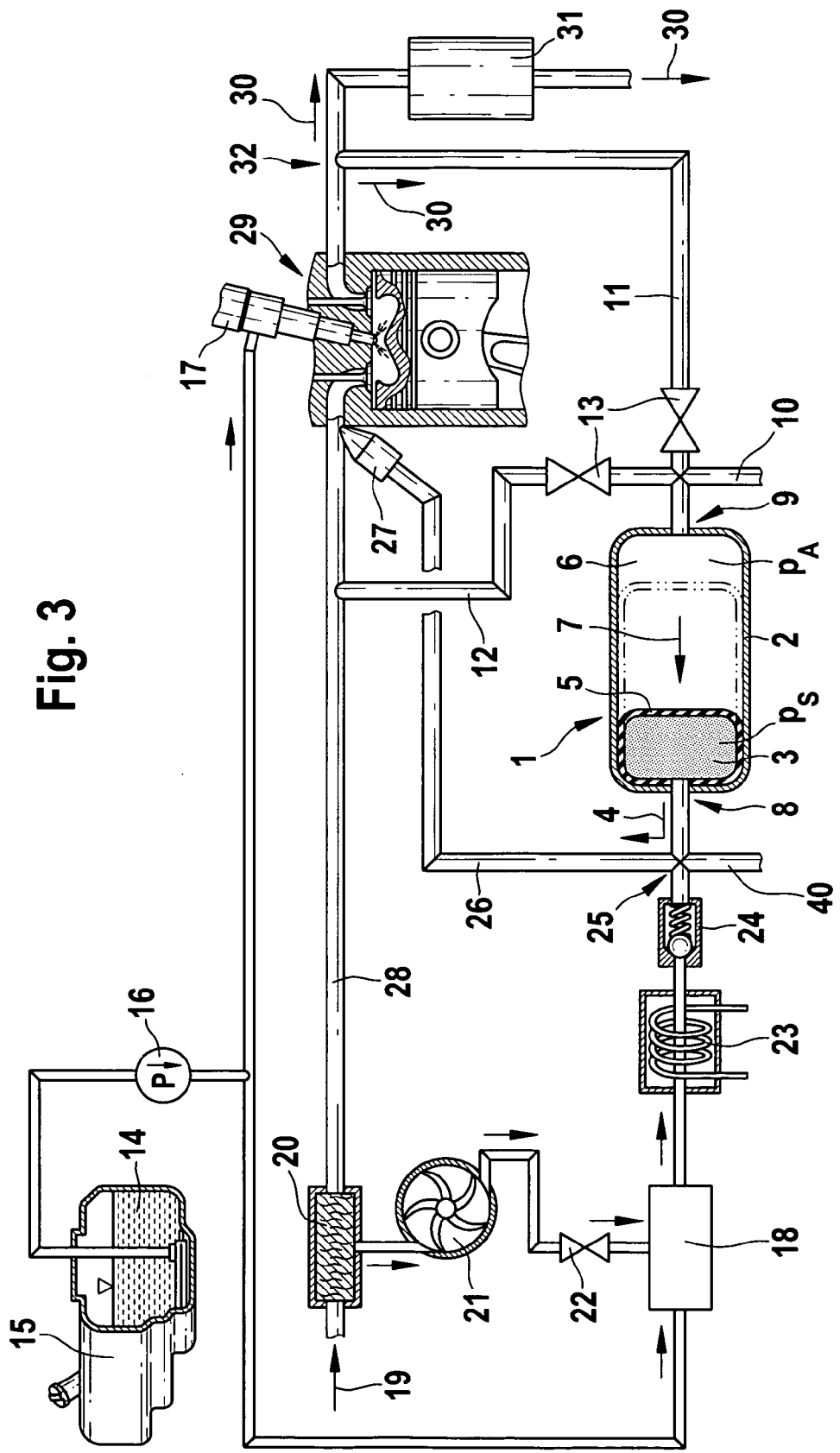

VEHICLE WITH A SUPPLY UNIT

BACKGROUND OF THE INVENTION

CROSS-REFERENCE

The invention described and claimed herein below is also described in DE 10 2004 063 071.2, filed Dec. 28, 2004. This German Patent Application. whose subject matter is incorporated here by reference, provides the basis for a claim of priority of invention under 35 U.S.C. 119 (a)-(d).

The present invention relates to a vehicle with a supply unit for supplying a fuel system, in particular an internal-combustion engine, a fuel cell unit, a catalytic converter and/or the like, with a fuel gas.

Modern internal-combustion engines, in particular gasoline engines for vehicle propulsion, are equipped with catalytic exhaust-gas converters. Particularly during cold starts, however, even higher quantities of unburned hydrocarbons are emitted, e.g., due to incomplete fuel evaporation or fuel condensation on the still-cold cylinder walls, but also due to the fact that the temperature of the catalytic converter is still too low.

Adding hydrogen ($H_2$) or hydrogenous reformate gas to the internal-combustion engine results in improved combustion properties and lower emissions. For the starting phase, it is possible to add hydrogen or hydrogenous reformate gas to the fuel, or to burn this reformate gas exclusively in the internal-combustion engine. The hydrogen can be produced in a suitable quantity "on board" the vehicle, e.g., via the step of reformation from liquid hydrocarbons such as gasoline or diesel fuel, etc., atmospheric oxygen and water. In the case of steam reforming, for example, only water is used. In the case of autothermal reforming, water and air are used, and in the case of partial oxidation, only air is used. In the reforming process, hydrogen is produced, as is carbon monoxide (CO), which is also suitable for combustion in the internal-combustion engine.

While the reformer is starting up, however, only a very small amount of reformate gas or none at all is delivered for use in the engine combustion chamber. Hydrogen and reformate gas reservoirs are already known for use to bridge this phase; they are generally filled with combustible reformate gas after the start-up phase or the cold start.

It is disadvantageous, however, that the reservoir pressure is limited by the low reformer operating pressure (e.g., approx. 2 bar), since intermediate compression of the gas upstream of the reservoir is generally considered not to be particularly advantageous, for reasons of energy and system complexity. Higher reservoir pressures could be achieved using higher reformer pressures, but this generally fails because the air compression that takes place upstream of the reformer is technically more complex and requires greater energy expenditure. The storage volume of the gas reservoir must therefore be designed appropriately large in size for a given preheating time and engine power. Due to inert gas components in the reformate gas, such as carbon dioxide, nitrogen, water, etc., the storage volume actually required is approximately three-fold greater than is actually necessary.

In addition, it is a disadvantage that the compressed gas reservoir—which is generally common—cannot be emptied completely, and instead can only be emptied to the point of pressure equalization. As such, a comparably large dead volume in the reservoir is unusable.

Furthermore, vehicles with fuel cells are already in use, the fuel cells being used in particular to supply energy to the drive motor and/or to supply energy to electrical devices as "APUs". When the fuel cell is used to supply energy to an electric drive motor, an internal-combustion engine is usually not provided.

Vehicles of this type that rely on fuel cells to supply electrical power also include reformers for reforming hydrocarbons into a fuel gas. With these vehicles, reservoirs for storing the reformate gas are already known.

In addition, metal-hydride reservoirs or the like—in addition to compressed gas reservoirs—are already used in fuel-cell vehicles.

SUMMARY OF THE INVENTION

It is therefore an object of the present invention to propose a vehicle a supply unit for supplying a fuel system with a fuel gas, the fuel system being designed to chemically reform the fuel gas, and a gas reservoir with a storage volume for the intermediate storage of the fuel gas being provided, and the storage of the fuel gas being improved during "low-pressure" applications in particular.

In keeping with these objects and with others which will become apparent hereinafter, one feature of the present invention resides, briefly stated, in a vehicle, comprising a fuel system operative to chemically reform a fuel gas; a supply unit for supplying said fuel system with the fuel gas; and a gas reservoir provided with a storage volume for an intermediate storage of the fuel gas, said storage volume having a changeable size.

A vehicle according to the present invention is unique in that the size of the storage volume of the gas reservoir is changeable. This feature makes it possible, e.g., to evacuate the stored fuel gas completely. For example, when the gas reservoir is empty, the storage volume is nearly zero. This is a particular advantage with "low-pressure" systems in particular, since the efficiency of storage is markedly increased compared to the related art. With the related art, in the case of which compressed gas reservoirs or metal-hydride reservoirs having a constant storage volume are used, a considerable quantity of fuel gas still remains in the gas reservoir in the evacuated state, which markedly degrades the efficiency of storage.

In addition, with a storage volume that changes in terms of size, it is advantageous that a different amount of space is required depending on the quantity of fuel gas being stored. For example, when a gas reservoir has been largely evacuated, it is possible for it to take up only a very small amount of the space available in the vehicle.

For example, the gas reservoir is designed in the style of a bellows or the like, with the volume stored in the reservoir being changeable according to the present invention. Advantageously, a wall element can be provided, at least a portion of which can be folded or rolled.

The gas reservoir preferably includes at least one elastically expandable wall element. With an elastically expandable wall element of this type, the size of the storage volume of the gas reservoir is changeable in a particularly simple manner. For example, the elastically expandable wall element is designed in the manner of a bladder, a balloon, a diaphragm or the like.

As an alternative or in combination therewith, the gas reservoir can also include—in a hollow shape, in particular in a cylinder or the like—an adjustable and/or displaceable wall element, such as a piston or the like. In a corresponding embodiment of the present invention, the external or total volume of the gas reservoir that takes up space remains constant, for example, regardless of the extent to which the gas reservoir is filled. At the same time, however, according to the present invention, the size of the storage volume—which is limited at least partially by the displaceable pushing device or the like in particular—can be changed accordingly.

Mechanical filling and/or evacuation of the gas reservoir and/or the storage volume can also be provided, if necessary. For example, the displaceable piston in a cylinder can be adjusted mechanically with the aid of a drive device such as an electric motor, etc., such that the storage volume is enlarged and, as a result, fuel gas is suctioned into the gas reservoir.

A filling device for filling and/or evacuating the gas reservoir with fuel gas preferably has at least one compressed gas for applying external pressure to the storage volume of the gas reservoir. Pneumatic filling and/or evacuation of the gas reservoir is realizable as a result. This is an advantage in particular with the embodiment according to the present invention in which an elastically expandable wall element is provided. This elastically expandable wall element is acted upon in an advantageous manner by the pneumatic filling and/or evacuation.

Advantageously, the gas reservoir includes at least a second storage volume for the intermediate storage of the compressed gas. Preferably, at least one partition is provided in the gas reservoir, with the intermediately-stored fuel gas located on one side, and the intermediately-stored compressed gas located on the other side.

In a particular embodiment of the present invention, the size of the second storage volume is changeable. By changing the second storage volume, the filling and/or evacuation of the gas reservoir and/or the first storage volume for the fuel gas can be realized in an advantageous manner.

In a preferred embodiment of the present invention, at least one protection device is provided to safeguard the gas reservoir, the total storage volume of the gas reservoir being essentially determined by the protection device. For example, the protection device is designed as a mechanically-fixed screen, brace, fabric or the like; mechanical protection of at least the first storage volume for the fuel gas is realizable as a result.

The protection device preferably includes at least one substantially closed container wall. In particular, the protection device is realized as a nearly closed container, in particular as a pressure vessel, with at least one supply and discharge line.

In a preferred embodiment of the present invention, the filling device includes at least the protection device. For example, the filling device and/or protection device is designed as a nearly closed container as described above, so that storage of the compressed gas can be realized in an advantageous manner.

In a preferred embodiment of the present invention, the gas reservoir is designed—at least in an operating state—such that the stored fuel gas is located on one side of the wall and atmospheric air is located on the other side or outside of the wall.

In a particular further development of the present invention, the compressed gas is configured as intake air of the internal-combustion engine. In terms of the present invention, "intake air" is understood to be the air to be drawn into the internal-combustion engine with a small amount of vacuum; in modern vehicles, this air is located between the air filter and the internal-combustion engine. The intake air of the internal-combustion engine has a vacuum in the range of 0.3 to 0.7 bar, and is therefore less than the atmospheric air pressure of approximately 1 bar.

The use of intake air as the compressed gas in the filling device is of particular advantage in a filling phase of the gas reservoir. For example, the fuel gas presses—with a pressure of approximately 2 bar—against the relatively low pressure of the intake air entering the gas reservoir from the reformer, enabling the gas reservoir to be filled with fuel gas in an advantageous manner.

The compressed gas is preferably configured as the exhaust gas from the internal-combustion engine. With modern vehicles, the pressure of exhaust gas from the internal-combustion engine is greater than atmospheric pressure, thereby allowing this pressure to be used to evacuate the gas reservoir in an advantageous manner. For example, the exhaust gas presses—with approximately this amount of pressure—against the fuel gas stored in the first storage volume of the gas reservoir, the storage volume being connected with the intake region of the internal-combustion engine, e.g., in the evacuation phase, in which a pressure of approximately 0.3 to 0.7 bar exists. The pressure differential enables an advantageous evacuation of the first storage volume with fuel gas to be realized. The first storage volume of the fuel gas can therefore be reduced to nearly zero, so there is nearly no dead volume in the fuel gas reservoir.

Preferably, at least one reformer unit is provided for reforming a fuel into the fuel gas. For example, the reforming unit is designed as a reformer for reforming the fuel into the fuel gas.

In a particular further development of the present invention, at least one cooling device is provided to cool the fuel gas and/or the compressed gas, in particular the exhaust gas and/or the reformer gas. As a result, it is also possible to use materials with less temperature-resistant properties, such as plastics, rubber or the like, for the gas reservoir or, in particular, the elastically expandable wall element. On the other hand, the cooling of the fuel gas in particular results in an effective reduction in the storage volume required, i.e., in the first storage volume required, which increases the efficiency of storage even further. As a result, the energy density of the stored gas or the fuel gas is increased accordingly. This means the quantity of fuel gas stored in the first storage volume or the gas reservoir is increased.

Basically, the fuel gas can be used, preferably in a cold-start phase, to supply the internal-combustion engine or the gasoline engine, a fuel cell unit or fuel cell stack, a vehicle catalytic converter, in particular the catalytic exhaust-gas converter and/or catalytic converters in a fuel cell system with the fuel gas according to the present invention in an advantageous manner, with the components described above combusting or oxidizing the fuel gas in an advantageous manner.

With vehicles with internal-combustion engines, engine work is preferably used to fill and/or evacuate the first storage volume or the gas reservoir. As a result, in particular, no separate filling or evacuation drives or the like are required.

By using the different pressures of operating gases such as exhaust gas, intake air, atmospheric air, etc., available in a vehicle, a particularly effective filling and/or evacuation of the first storage volume for the fuel gas can be implemented in an advantageous manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows a schematic block diagram of the internal-combustion system in a evacuation phase.

DESCRIPTION OF THE PREFERRED EMBODIMENTS

Figure 1A:
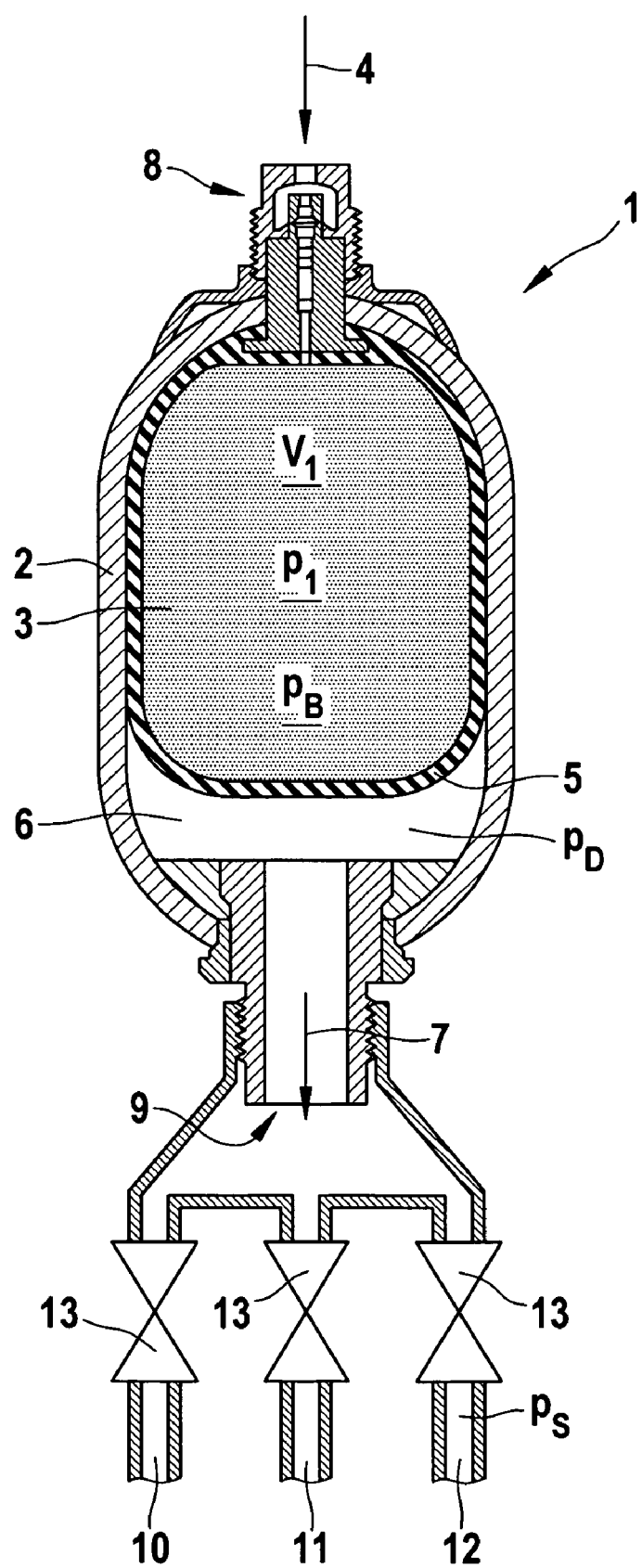
FIGS. 1a and 1b show a schematic illustration of a gas reservoir according to the present invention in a filling phase a and in an evacuation phase b.

A gas reservoir 1 according to the present invention is shown schematically in FIG. 1. Gas reservoir 1 includes a housing 2, which is configured, e.g., as a pressure vessel housing 2. The storage volume 3 for storage of a fuel gas 4 is located in gas reservoir 1.

A bladder 5, essentially, for delineating storage volume 3 is provided between fuel gas 4 and housing 2 of gas reservoir 1. In the exemplary embodiment of the present invention shown, bladder 5 is designed as an elastically expandable bladder.

In addition to storage volume 3 for fuel gas 4, gas reservoir 1 also includes a second storage volume 6 for a compressed gas 7. Compressed gas 7 is delineated by housing 2 and bladder 5.

Gas reservoir 1 includes a first opening 8 for fuel gas 4 and a second opening 9 for compressed gas 7. The two openings are provided for the inflow and outflow of corresponding gases 4, 7. In principle, separate inflow and outflow openings can also be provided.

A filling state of gas reservoir 1 for fuel gas 4 is shown in FIG. 1a. This also means that this is an evacuation phase of gas reservoir 1 for compressed gas 7. With the filling phase according to FIG. 1a, fuel gas 4 flows into storage volume 3 with a first pressure $p_1$ and produces a volume $V_1$. Compressed gas 7 has a pressure $p_D$, which is less than pressure $p_B$ of fuel gas 4. Three outflow lines, each with a valve 13, are shown schematically in FIG. 1 in the region of opening 9 for compressed gas 7. For example, line 10 is designed for the inflow and outflow of atmospheric air, line 11 is designed for the inflow and outflow of exhaust gas, and line 12 is designed for the inflow and outflow of intake air in an internal-combustion engine of a vehicle. For example, in the filling phase, valve 13 in line 12 for intake air is opened with pressure $p_s$=0.3 to 0.7 bar, so that an advantageous pressure gradient is realized between volume 3 and volume 6, so that bladder 5 expands and storage volume 3 gradually increases, and fuel gas 4 therefore flows into gas reservoir 1.

Figure 1B:
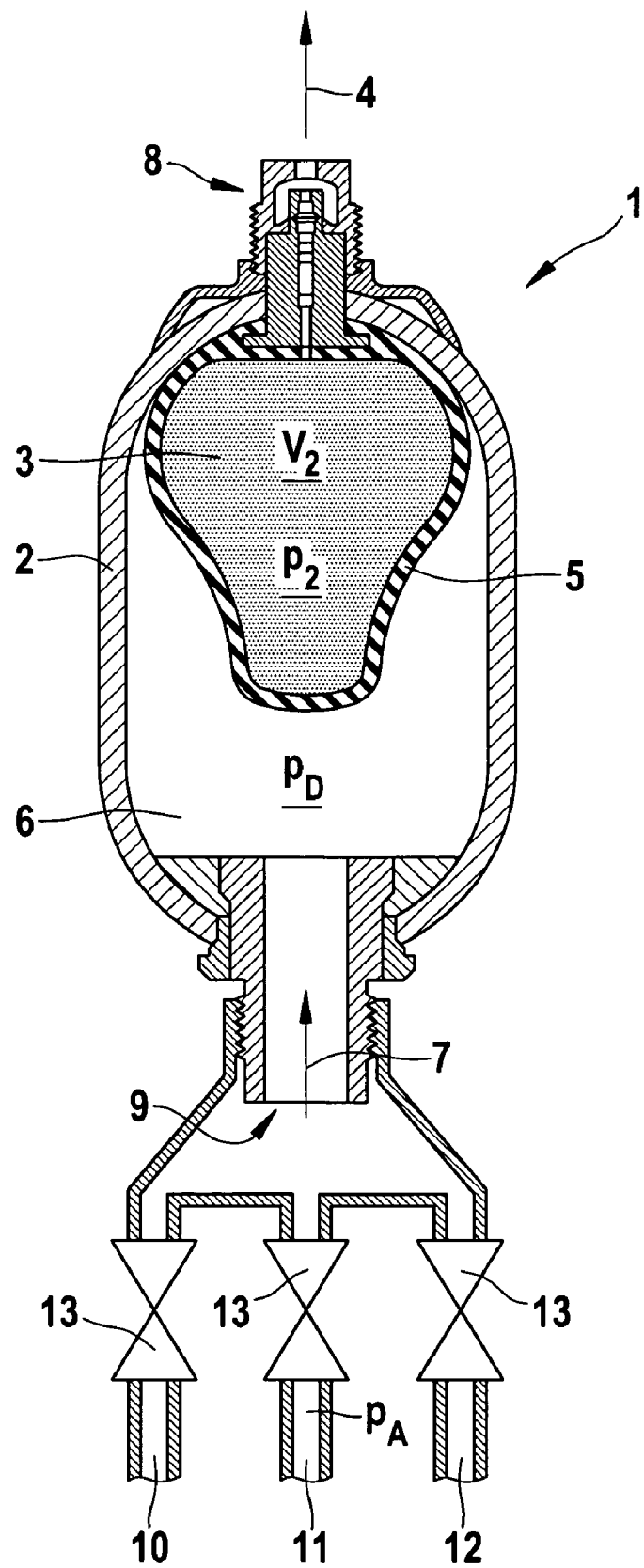

An evacuation phase of gas reservoir 1 for fuel gas 4 is shown in FIG. 1b. In the example shown, this means that fuel gas 4 flows out of gas reservoir 1 and, at the same time, compressed gas 7 flows into gas reservoir 1 through opening 9, so that volume 6 gradually increases and volume 3 gradually becomes smaller. According to FIG. 1b, a storage pressure $p_2$ with a volume $V_2$ exists in storage volume 3 of fuel gas 4; storage pressure $p_2$ is less than pressure $p_D$ of compressed gas 7. In this case, for example, valve 13 in line 11 for the exhaust gas from the internal-combustion engine of the vehicle is opened, so that volume 6 is acted upon with an exhaust-gas pressure $p_A$ that is greater than atmospheric pressure. In this phase, fuel gas 4 can be directed to an intake manifold—not shown in FIG. 1—of the internal-combustion engine, which has a pressure $p_s$ of 0.3 to 0.7 bar. As a result, an advantageous pressure gradient is realized that results in the gradual evacuation of storage volume 3.

A bladder reservoir 1 is shown in FIG. 1 as an example. According to the present invention, a diaphragm reservoir, piston reservoir, bellows or the like can also be used in particular.

Figure 2:
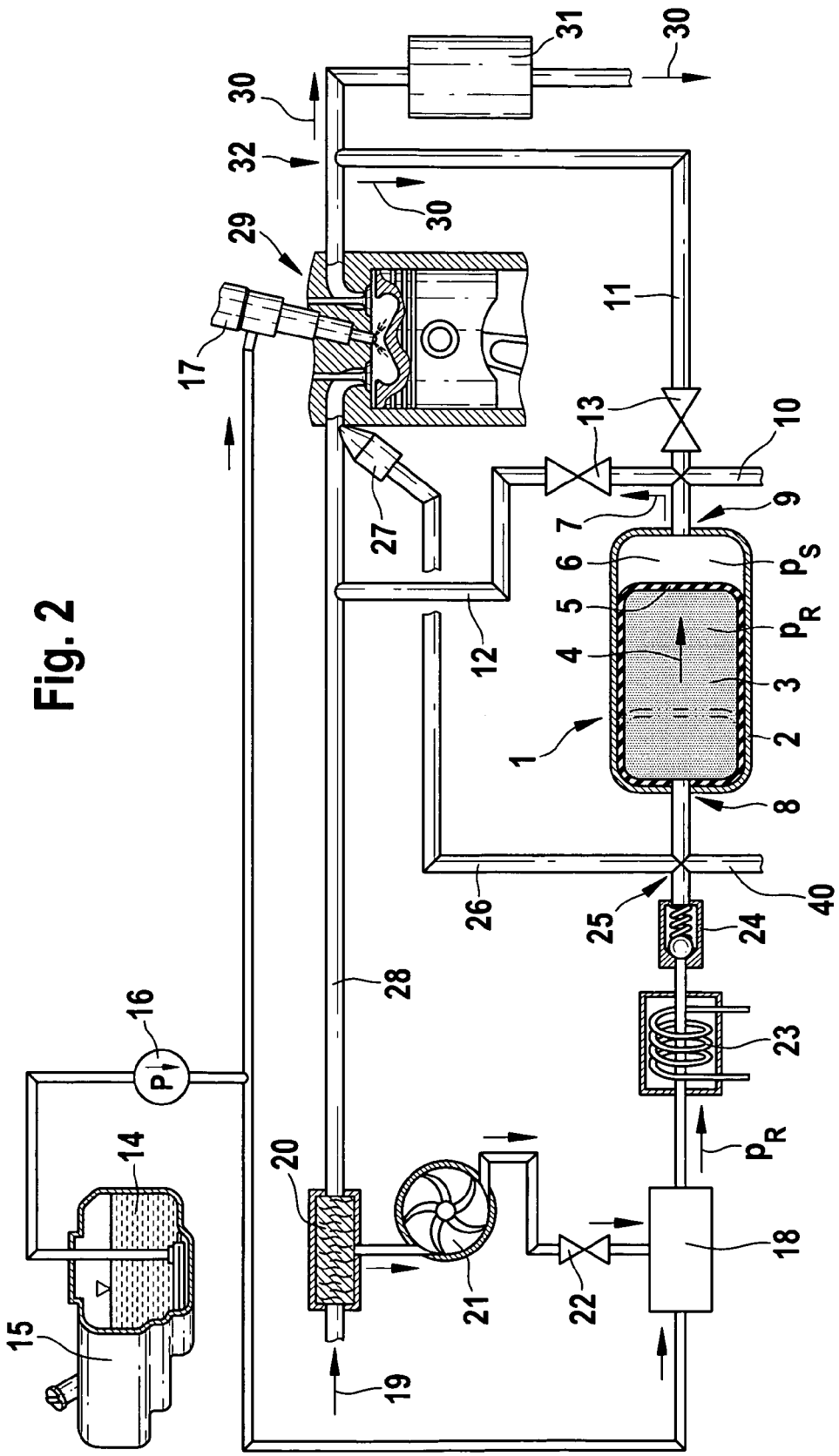
FIG. 2 shows a schematic block diagram of an internal-combustion system with a gas reservoir according to the present invention, in the filling phase.

The integration of gas reservoir 1 in a supply and/or drive system of a vehicle according to the present invention is shown in greater detail in particular in FIGS. 2 and 3, the filling of fuel gas 4 being shown in greater detail in FIG. 2, and the evacuation of fuel gas 4 from gas reservoir 1 being shown in greater detail in FIG. 3. In FIGS. 2 and 3, elements having the same reference numerals as those used in FIG. 1 are designed as comparable components.

In these embodiments of the present invention, e.g., fuel 14 is pumped out of a tank 15 using a pump 16 to a valve 17, in particular an injection valve with a nozzle, and to a reformer 18. Fuel 14 can be gasoline, diesel fuel or the like.

To reform fuel 14, reformer 18 also requires air 19, which it receives via either a filter 20, a fan 21 or a valve 22, in particular a metering valve 22. Reformer 18 generally functions at comparably high operating temperatures and has a catalytically active substance for reforming fuel 14 into a reformate containing hydrogen and/or carbon monoxide.

Cooling 23 is preferably located downstream of reformer 18, so that the reformate has temperatures below approximately 100° C. A valve 24 and a branching 25 are located between cooling 23 and gas reservoir 1. In FIGS. 2 and 3, valve 24 is designed als a non-return valve 24. In special applications, this non-return valve can also be designed as a control or switching valve 24, e.g., in accordance with valves 13. A line 26 branches off from branching 25 to a valve 27, which is designed, in particular, as a metering valve 27 with a nozzle.

Filter 20 is connected via a line 28 with an engine 29 or with a combustion chamber of engine 29, so that atmospheric air 19 can be supplied to it. Fuel 14 is metered via valve 17 to engine 29 and, via valve 27, reformate from reformer 18 can be supplied or metered directly and/or indirectly to engine 29 from gas reservoir 1. The supply of reformate from reformer 18 or gas reservoir 1 takes place in a cold-start phase of engine 29 in particular, so that exhaust gas 30 from engine 29 contains relatively few harmful emissions. For exhaust treatment, a catalytic converter 31 and, in particular, one or more lambda probes, etc., which are not shown, are also provided.

A branching 32 is located downstream of engine 29 in particular, so that exhaust gas 30 can be directed to catalytic converter 31 and storage volume 6 of gas reservoir 1 via line 11 and valve 13.

In addition, storage volume 6 for compressed gas 7 in gas reservoir 1 is advantageously connected via line 12 and valve 13 with intake line 28, so that intake air 19 in engine 29 is usable as compressed gas 7 according to the present invention.

The filling as illustrated in FIG. 2 and the evacuation as illustrated in FIG. 3 takes place essentially as described in detail with reference to FIG. 1. In addition, line 10 for ambient air 19 is shown only schematically in FIGS. 2 and 3. Line 10 can also be eliminated. In this case, for example, exhaust gas 30 and—in special operating cases—atmospheric air could be supplied to gas reservoir 1 via line 11.

In the filling process illustrated in FIG. 2, valve 13 in line 12 is opened, and valve 2 in line 11 is closed. Reformer 18 produces, e.g., a reformate with a pressure $p_R$ of approximately 2 bar, so that this pressure $p_R$=2 bar exists in storage volume 3 and intake manifold pressure $p_s$ of approximately 0.3 to 0.7 bar exists in storage volume 6. As a result, bladder expands as indicated by the arrow such that storage volume 3 increases and storage volume 6 decreases.

In the case of evacuation as illustrated in FIG. 3, valve 13 in line 12 is closed, and valve 13 in line 11 is open, so that an exhaust-gas pressure $p_A$ in storage volume 6 is greater than atmospheric pressure. Valve 24 is closed, so that storage volume 3 with engine 29 is acted upon via line 26 with intake pressure $p_s$ of approximately 0.3 to 0.7 bar. As a result, a pressure gradient exists in gas reservoir 1 that causes bladder 5 to contract as illustrated by the arrow, and stored fuel 4 or reformate is supplied to engine 29 via line 11 and open valve 27.

In addition, an advantageous evacuation 40 can be provided, according to FIGS. 2 and 3 in particular, with which fuel 4 is usable for further applications. For example, fuel 4 can be supplied to a fuel cell unit or a fuel cell stack.

Basically, an advantageous control unit can be provided for controlling the filling and evacuation procedure of gas reservoir 1. For example, the control unit is integrated in the engine management or, in the case of fuel cells, in the fuel-cell regulating system of the vehicle and, in particular, is advantageously connected with the valves shown and the other active components and/or actuators, and with sensors to be provided as necessary.

In general—although this is not shown in greater detail—relatively hot exhaust gas 30 can also be cooled using a cooling device to temperatures less than 100° C., so that bladder 5 is exposed to relatively low thermal stress.

It will be understood that each of the elements described above, or two or more together, may also find a useful application in other types of constructions differing from the types described above.

While the invention has been illustrated and described as embodied in a vehicle with a supply unit, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set fourth in the appended claims.

The invention claimed is:

1. A vehicle, comprising a fuel system operative to chemically reform a fuel gas; a supply unit for supplying said fuel system with the fuel gas; and a gas reservoir provided with a storage volume for an intermediate storage of the fuel gas, said storage volume having a changeable size, said gas reservoir comprising three outflow lines, wherein a first outflow line is configured for inflow and outflow of atmospheric air, wherein a second outflow line is configured for inflow and outflow of exhaust gas, and wherein a third outflow line is configured for inflow and outflow of intake air in an internal combustion engine of the vehicle.

2. A vehicle as defined in claim 1, wherein said reservoir includes at least one elastically expandable wall element.

3. A vehicle as defined in claim 1, wherein said gas reservoir includes at least one displaceable wall element.

4. A vehicle as defined in claim 1, wherein said gas reservoir includes at least a second storage volume for an intermediate storage of compressed gas.

5. A vehicle as defined in claim 1; and further comprising at least one reformer unit for reforming a fuel into a fuel gas.

6. A vehicle as defined in claim 1; and further comprising at least one cooling device for cooling at least one of the fuel gas and compressed gas.

7. A vehicle as defined in claim 1; and further comprising a filling device for at least one of filling and evacuating said gas reservoir and including at least one compressed gas for applying pressure to said storage volume of said gas reservoir.

8. A vehicle as defined in claim 7, wherein said filling device includes at least a protection device.

9. A vehicle as defined in claim 7, wherein said filling device is configured so that the compressed gas is intake air of an internal combustion engine.

10. A vehicle as defined in claim 7, wherein said filling device is configured so that the compressed gas is exhaust gas from an internal combustion engine.

11. A vehicle as defined in claim 1; and further comprising at least one protection device for protecting said gas reservoir, so that a maximum storage volume of said gas reservoir is substantially determined by said protection device.

12. A vehicle as defined in claim 11, wherein said protection device includes at least one substantially closed container wall.

* * * * *